July 12, 1955 G. H. BROWN 2,713,152

VESTIGIAL SIDE BAND FILTER

Filed June 28, 1950

INVENTOR
GEORGE H. BROWN
BY Harry Tunick
ATTORNEY 2,713,152

VESTIGIAL SIDE BAND FILTER

George Harold Brown, Princeton, N. J., assignor to Radio Corporation of America, a corporation of Delaware Application June 28, 1950, Serial No. 170,915

The terminal 15 years of the term of the patent to be granted has been disclaimed 9 Claims. (Cl. 333—9)

Figures 1, 2:
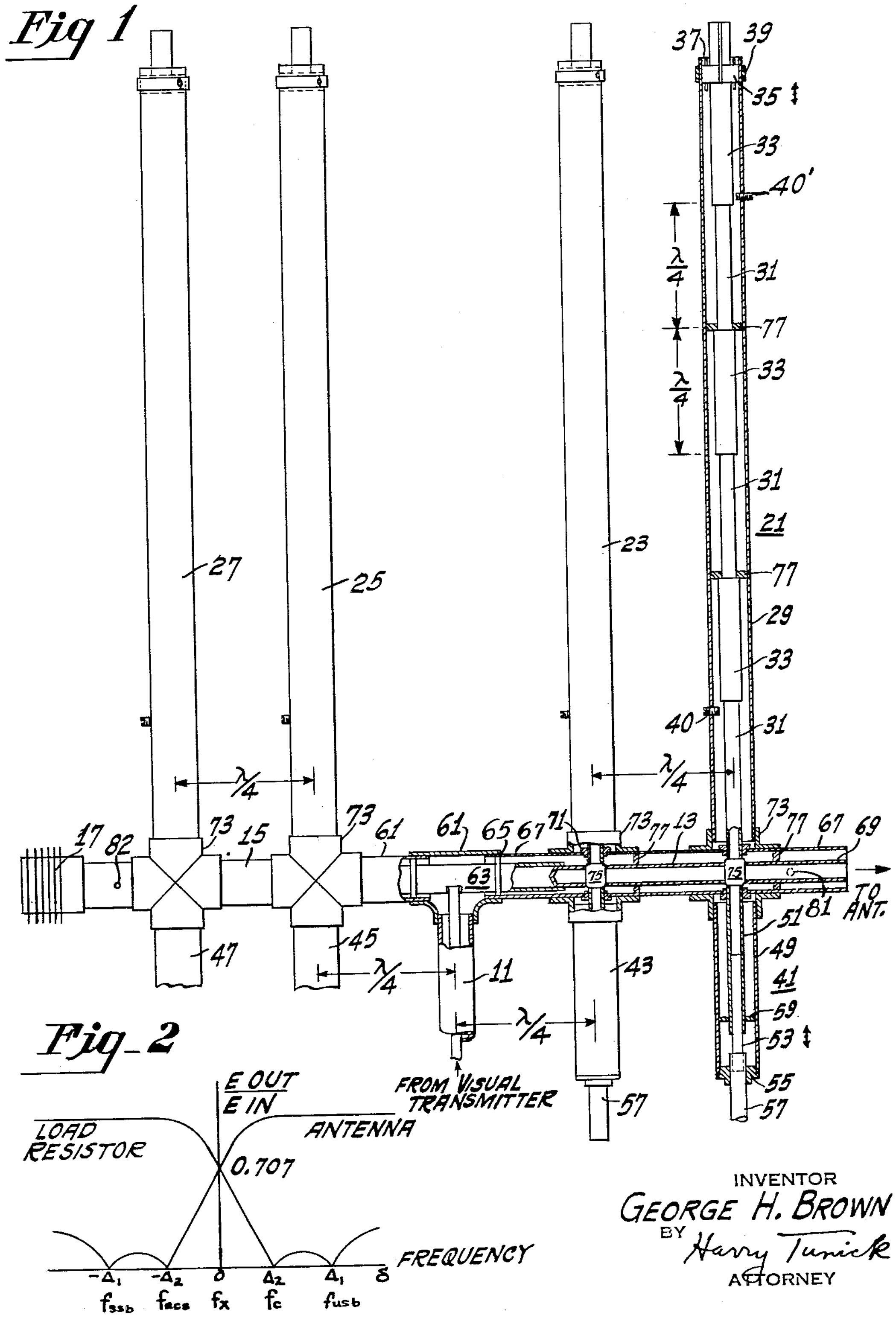

The invention relates to radio frequency filter arrangements. It particularly pertains to a vestigial side band filter circuit for use with ultra high frequency radio wave transmitters. It more especially pertains to television signal transmission systems.

In conventional television signal broadcasting two carrier frequency waves are generated. One of the carrier frequency waves is amplitude modulated with signal representative of picture intelligence and is termed the visual carrier. The other carrier wave is frequency modulated with sound signals and is termed the aural carrier. The television receiver designed to receive such programs accepts the aural carrier and aural side bands, the upper visual side bands, the visual carrier, and those lower visual side bands which lie closely adjacent the carrier. The lower visual side bands remaining are preferably suppressed at the transmitter in order that there may be little or no interference caused to other services operating on adjacent frequency channels.

In order to transmit television signals in this manner, it has been suggested that a filter be placed in the transmission line between the power amplifier of the transmitter and the transmitting antenna. Such a filter is preferably so designed that the input resistance thereof is practically constant for both the pass and rejection bands while the reactance remains essentially zero over the desired band. Because of the high carrier frequency as well as the extreme selectivity required, the circuit elements of such filters are usually in the form of sections of concentric transmission line arranged to present the proper series reactance required to suppress the underside side band frequencies while permitting the desired frequencies to pass substantially without attenuation.

These prior art filters have several inherent disadvantages. The series arrangement is bulky, difficult to install, and more difficult to adjust after installation. It is expensive to construct, due mainly to the requirement for specially constructed transmission line components.

It is an object of the invention to provide an improved vestigial side band filter employing only shunt reactance elements.

It is a further object of the invention to provide an improved vestigial side band filter for a television transmitting arrangement which is easily constructed and readily adjusted.

It is another object of the invention to provide an improved vestigial side band filter that is economical in construction and employs standard readily available components throughout.

These and other objects of the invention, which will appear as the specification progresses, are attained in a vestigial side band filter, constructed of readily available coaxial transmission line components and requiring relatively few and extremely simple adjustments for optimum performance. The filter according to the invention comprises a branching arrangement of transmission line, each of the branches having a plurality of shunt reactance and impedance matching elements connected thereacross at intervals substantially of a quarter wavelength at the mid-band operating frequency. One of the branch lines is terminated in a dissipation resistor element and the other is connected to an antenna or other useful load device. The shunt elements are adjusted to divert energy of the undesired sidebands into the dissipation resistor element and direct the remainder of the energy to the useful load. In a typical embodiment of the invention four shunt elements are used, two across the load branch and two across the resistor branch. Such an arrangement results in five matched impedance points. One of these points is at the cross-over frequency and the result is there obtained by adjusting the input impedance of low pass and high pass portions of the side band filter complementary. The normalized conductance of the input to the low pass and high pass sections are equal to $+\frac{1}{2}$ at the cross-over frequencies. The normalized susceptances are equal and opposite in sign, thus making the input admittance to the filter system a normalized conductance of one and zero susceptance at cross-over. The rejector circuits in the high pass portion of the filter are parallel resonated at one frequency $\Delta_2$ in the pass band. The impedance is matched at this parallel resonant frequency. The rejector circuits in the low pass portion of the filter are similarly parallel resonated at a frequency $-\Delta_2$ in the reject band resulting in a similar matched impedance point in the reject band. If additional sections are used, a corresponding number of match points will be obtained, and so on. The reject circuits in the high pass and low pass portions of the filter are tuned to different frequencies. Proper selection of the reactance slopes and reject frequencies causes one rejector circuit to compensate for the mismatch introduced by the other to obtain an additional matched impedance point in the pass and reject band.

The invention will be better understood from the following description making reference to the accompanying drawing forming a part of the specification and in which:

Fig. 1 is a schematic diagram of a vestigial side band filter arrangement according to the invention; and Fig. 2 is a graphical representation of an ideal voltage ratio-frequency characteristic obtained with a vestigial side band filter according to the invention.

Referring to Fig. 1, there is shown a vestigial side band filter according to the invention to which a transmitter (not shown) is coupled by means of a length of coaxial transmission line 11 to a branching coaxial transmission line network including a load transmission line 13 and a sink transmission line 15. An antenna or other useful load (not shown) is connected to transmission line 13 and a sink element 17 preferably in the form of a resistor terminates transmission line 15 in its characteristic impedance. Sink element 17 itself forms no part of the invention, is being recognized that any number of known arrangements may be employed for the purpose to full advantage.

Mechanically identical reactance elements 21, 23 and 25, 27 are shunted across transmission lines 13 and 15 at intervals of a quarter wavelength at the midband operating frequency. Each such element is constructed in the form of a stepped coaxial transmission line having an outer conductor 29 and an inner conductor comprising segments 31, 33 of different diameters, more fully explained hereinafter. An adjustable shorting bar arrangement 35 is located at the outer end of each reactance element between outer conductor 29 and the final segment 33 of the inner conductor. To provide satisfactory electrical connection at this point, slits 37 are provided and the parts are firmly clamped by a clamping ring 39. A conventional screw-adjusted hose clamp has been found entirely satisfactory for this purpose. A finer adjustment may be realized by the use of a variable capacitive element arranged to provide a small capacitive reactance between the conductors of reactance sections 21, 23, 25 and 27, preferably at a point approximately a quarter wavelength from the low impedance point. One practical embodiment of such a device is exemplified by a screw 40 which is arranged to be inserted more or less into the interior of conductor 29. Obviously, such an expedient may be employed elsewhere in the structure, if desired.

For every reactance element employed, an impedance matching line section 41, 43, 45, 47 is shunted across the transmission line sections. These sections comprise an outer sheath conductor 49 and a central conductor 51 having an extensible portion 53. A spacing member 55 is arranged in the end of conductor 49 and a Bakelite rod 57 is slidably positioned in an aperture through member 55 for adjusting the effective length of the central conductor 51. Such adjustment may be also provided by making a screw connection between conductor 51 and portion 53, in which case rod 57 would be rotated to effect the adjustment. A teflon insulator 59 is preferably employed to maintain the mechanical relationship between conductors 49 and 51, which construction permits rod 57 to be removed after adjustment if desired.

It should be understood that either open-ended or shorted line sections may be used, depending entirely on the circumstances of the individual case.

The entire filter structure is advantageously assembled from commercially available parts. Practically no special construction is required except for cutting tubing to the proper length and the like. A readily available T fitting 61 and a length of hollow conductor 63 fitted for connection to the inner conductor are connected to transmission line 11. Conductor 63 is preferably positioned by means of teflon insulators 65. Lengths of tubular conductor 67 and hollow conductor 69 are connected to each branch of T fitting 61, forming branch transmission lines 13 and 15. At intervals (stated elsewhere) along each branch transmission line, apertures are provided in conductor 67 in which insulating bushings 71 are inserted and through which conductor 31 and 51 pass. Outer conductors 67, 49 and 27 are joined by commercially available cross fittings 73 which provide both good electrical connection and firm mechanical support. Located centrally of each cross fitting 73 is an annular member 75 electrically and mechanically coupling inner conductors 31, 51 and 69. At various intervals teflon spacers 77 are employed to insure proper spacing between conductors 67 and 69. Apertures 81 and 82 are provided at the ends of branch transmission lines 13 and 15, respectively, to permit probe elements to be inserted for testing and measuring purposes.

At a frequency of 500 megacycles per second a quarter wavelength is on the order of 6 inches, whereby construction on the lines of Fig. 1 is sufficiently compact for many installations. It is pointed out that the arrangement can be readily assembled in somewhat different form if desired or found necessary. For example, the four elements 21, 23, 25 and 27 can be placed at the corners of a parallelepiped and transmission line 11 centrally arranged. Other modifications of the layout will be obvious to the artisan.

In operation, reactance elements 21 and 23 are adjusted to present short circuit impedances to branch transmission line 13 at predetermined frequencies in the lower side band below the carrier frequency. The two frequencies are chosen with regard to overall response in the desired pass band. Reactance elements 25 and 27 are adjusted to present short circuit impedance at carrier and a higher frequency above the cross-over frequency by the same amount that elements 23 and 21, respectively, are tuned below the cross-over frequency. This complementary tuning provides five points of input impedance match, one of the points being at the cross-over frequency. The filter arrangement according to the invention is essentially a frequency dividing network comprising a low pass filter and a high pass filter connected in parallel to the transmitter and having impedance values such that the square of the value of characteristic impedance of the input transmission line is equal to the product of the filter impedance values. In other words, $$Y_{Hi} \cdot Y_{Lo} = Y_O \quad (1)$$

A constant resistance load is thereby presented to the transmitter.

The frequency response of a filter according to the invention of the type shown in Fig. 1 is graphically represented in Fig. 2. The use of two shunt elements in each of the low and high pass branches produces double-humped curves, it being understood that the addition of such elements will result in adidtional humps or side lobes in the curves. The number of elements chosen depends from a practical viewpoint on the required band width. The wider the frequency band required, the greater will be the number of shunt reactance elements necessary.

The frequencies to which the reactance sections are made resonant depend to a great extent on band width. A judicious choice of frequency spacing will provide optimum frequency response over the entire band of frequencies to be transmitted. In practice, however, the frequency spacing has not been found too critical insofar as overall frequency response is concerned. Other results obtainable with a filter according to the invention actually bear more importance in the choice of frequency spacing. For example, in a vestigial side band filter only a relatively small portion of the frequency range is to be suppressed. Energy at and near carrier frequency is to be radiated with as little loss as possible. Hence the carrier frequency should be well within the pass band to the antenna, and either beyond the pass band to the sink resistor or located at some minimum transfer point. In the instant illustrated by the curves of Fig. 2, the carrier frequency $f_c$ is located in frequency at $+\Delta_2$ where a short circuit impedance is presented in the sink branch due to reactance element 25 being so adjusted at this frequency. Energy at carrier frequency is thus concentrated in the antenna and eliminated from the sink.

From a practical standpoint, it is highly desirable that any energy of frequency falling within an adjacent service channel be suppressed. This may be readily accomplished by choosing the frequency at point $-\Delta_2$ equal to the frequency of the lower adjacent channel aural signal and tuning reactance element 21 to this frequency. In this manner a short circuit is presented in the antenna branch to energy at or near the frequency of adjacent channel sound, $f_{acs}$, whereby the undesired energy is dissipated in the sink branch.

From the practical standpoint the frequencies at points $\Delta_1$ and $\Delta_2$ have been established by circumstances of the problem, but the characteristics of the filter have not been formulated with respect to these specific frequencies. From an inspection of the curves it will appear that equal frequency spacing will probably provide one manner of determining the desired characteristic to satisfaction. Another practical viewpoint would be to determine at what frequency in the lower side bands, effective transmission of the visual signal would be obtained with 50 per cent of the energy radiated and 50 per cent dissipated. It seems that the cross-over frequency $f_x$ can be chosen in this manner to provide a highly satisfactory vestigial side band filter. Once the cross-over frequency $f_x$ is determined then the frequencies at $-\Delta_1$ and $\Delta_2$ are chosen complementary to $\Delta_1$ and $-\Delta_2$, respectively, and reactance elements 23 and 27 are tuned accordingly.

In one installation of a vestigial side band filter according to the invention, the visual carrier frequency $f_c$ was 530.000 Mc./s. The adjacent channel aural signal determined $f_{acs}$ to be 528.750 Mc./s. The mid-band or cross-over frequency $f_x$ was then determined to be 529.375 Mc./s. The remaining points $f_{ssb}$ and $f_{usb}$ in the suppressed and upper side bands, respectively were established at 527.000 and 531.750 Mc./s., respectively. For reasons beyond the problem of the vestigial side band filter, the carrier frequency was shifted to 530.250 Mc./s. and satisfactory operation was obtained without substantial change in any of the adjustments.

While a filter designed according to the above described procedure has given excellent results in operation on presently assigned television channels, it is recognized that changing standards may preclude rigid adherence to the rules laid down. It has been found that by choosing the frequency at $-\Delta_2$ to provide a desired overall response without regard to the adjacent channel signals, a notch filter can then be interposed in circuit with the vestigial side band filter to provide the desired suppression of energy at the critical point to achieve a highly satisfactory arrangement. These results are obtained to a satisfactory degree without going to the difficulty of providing complementary filtering action as is done in the vestigial side band filter itself. In this way the four frequency points $\Delta_1$, $-\Delta_1$, $\Delta_2$, $-\Delta_2$ can be chosen to give the minimum amplitude to the side lobes and still dissipate the undesired energy.

Impedance matching sections 41, 43, 45 and 47 are adjusted to present a matched impedance to transmission line 11 at the points $+\Delta_2$ and $-\Delta_2$. In practice a probe is inserted in either aperture 81 or 82 and wave energy indicating device coupled thereto to observe the effect of tuning the matching sections when a signal of carrier frequency is put on transmission line 11.

Reactance elements 21, 23, 25 and 27 were made of stepped short circuited transmission line in order to employ the reactance slope variation to advantage. With stepped lines a high reactance slope is obtained without using extremely long transmission lines. The reactance slopes obtained with a quarter wave stepped open-ended transmission line is:

$$\frac{dx}{df}=\frac{\pi Z_1}{2f_o}\left\{1+\frac{Z_1}{Z_2}\left[1+\frac{Z_3}{Z_2}\left(1+\frac{Z_3}{Z_4}\left\{1+\frac{Z_5}{Z_4}\left[\cdots\left(1+\frac{Z_{2n+1}}{Z_{2n}}\right)\right]\right\}\right)\right]\right\} \qquad (2)$$

For the shorted line the reactance slope is the same as that defined in Equation (2) with the term $Z_{2n+1}$ equal to zero.

Where $f_o$ is the carrier frequency;
$Z_{odd}$ is the impedance of successive segments 31; and
$Z_{even}$ is the impedance of successive segments 33.

Where the impedance of corresponding segments is the same for all and the number of segments is even, the Equation (2) corresponding to a short-circuited line reduces to:

$$\frac{dx}{df}=\frac{\pi n}{2f_o}Z_1\left(\frac{1}{n}+\frac{n-1}{n}\frac{Z_1}{Z_2}\right) \qquad (3)$$

Where $n$ is the number of quarterwave segments;
$Z_1$ is the impedance of segment 31; and
$Z_2$ is the impedance of segment 32.

While the invention has been described in terms of express embodiments, it is to be understood that many obvious modifications will be suggested to those skilled in the art without departing from the spirit and scope of the invention.

The invention claimed is:

1. A band dividing filter arrangement including an input transmission line, a first branch transmission line and a second branch transmission line connected in parallel to said input transmission line, a first transmission line element connected in shunt across said second branch transmission line at a point removed from the junction between said input and said branch transmission lines and a second transmission line element connected in shunt across said first branch transmission line at a point removed from said junction by the interval between said junction and the connection of said first element to said second branch transmission line, said first transmission line element being tuned to present substantially short circuit impedance at the point of connection to said second branch transmission line at a given frequency at which energy is to be transmitted along said first branch transmission line, said second transmission line element being tuned to present substantially short circuit impedance at the point of connection to said first branch transmission line at a predetermined frequency at which energy is to be transmitted along said second branch transmission line, said points being a half wavelength apart at the frequency midway between said given and said predetermined frequencies, and first and second transmission line sections connected in shunt across said branch transmission lines at the points of connection of said first and second transmission line elements respectively, said first transmission line section being adjusted in conjunction with said first transmission line element to parallel resonance at said predetermined frequency, said second transmission line section being adjusted in conjunction with said second transmission line element to parallel resonance at said given frequency.

2. A band dividing filter arrangement including an input transmission line, an output transmission line and a branch transmission line connected in parallel to said input transmission line, first and second transmission line elements connected in shunt across said branch transmission line at spaced intervals from the junction between said input and output transmission lines, and third and fourth transmission line elements connected in shunt across said output transmission line at said intervals, said first transmission line element being tuned to present substantially short circuit impedance at the point of connection to said branch transmission line at a given frequency, said second transmission line element being tuned to present substantially short circuit impedance at the point of connection to said branch transmission line at a second frequency to one side of said given frequency, said third transmission line being tuned to present substantially short circuit impedance at the point of connection across the output transmission line at a third frequency to the other side of said given frequency, said fourth transmission line element being tuned to present substantially short circuit impedance at the point of connection to the output transmission line at a fourth frequency farther to the other side of said given frequency and first, second, third and fourth adjustable transmission line sections connected in shunt across said transmission lines at the points of connection of said first, second, third and fourth transmission line elements respectively, each of said first and said second transmission line sections being adjusted in cooperation with the associated transmission line element to parallel resonance at said third frequency, each of said third and said fourth transmission line sections being adjusted in conjunction with the associated transmission line element to parallel resonance at said given frequency, said intervals being equal to a quarter wavelength at a frequency intermediate said given and said third frequencies.

3. A band dividing filter arrangement including an input transmission line, an output transmission line and a branch transmission line connected in parallel to said input transmission line, first and second transmission line elements connected in shunt across said branch transmission line at spaced intervals from the junction between said input and output transmission lines, and third and fourth transmission line elements connected in shunt across said output transmission line at said intervals, said first transmission line element being tuned to present substantially short circuit impedance at the point of connection to said branch transmission line at a given frequency, said second transmission line element being tuned to present substantially short circuit impedance at the point of connection to said branch transmission line at a second frequency to one side of said given frequency, said third transmission line being tuned to present substantially short circuit impedance at the point of connection across the output transmission line at a third frequency to the other side of said given frequency, said fourth transmission line element being tuned to present substantially short circuit impedance at the point of connection to the output transmission line at a fourth frequency farther to the other side of said given frequency by an amount equal to the frequency difference between said given and said second frequencies, and first, second, third and fourth adjustable transmission line sections connected in shunt across said transmission lines at the points of connection of said first, second, third and fourth transmission line elements respectively, each of said first and said second transmission line sections being adjusted in cooperation with the associated transmission line element to parallel resonance at said third frequency, each of said third and said fourth transmission line sections being adjusted in conjunction with the associated transmission line element to parallel resonance at said given frequency, the attenuation characteristics in said output and said branch transmission lines being in even symmmetry with respect to the frequency substantially midway between said given and said third frequencies, said intervals being equal to a quarter wave length at a frequency intermediate said given and said third frequencies.

4. A band dividing filter arrangement including an input transmission line, an output transmission line and a branch transmission line connected in parallel to said input transmission line, first and second transmission line elements connected in shunt across said branch transmission line at equally spaced intervals of a quarter wavelength at a predetermined central frequency from the junction between said input and output transmission lines, and third and fourth transmission line elements connected in shunt across said output transmission line at said intervals, said first transmission line element being tuned to present substantially short circuit impedance at the point of connection to said branch transmission line at a first frequency to one side of said central frequency, said second transmission line element being tuned to present substantially short circuit impedance at the point of connection to said branch transmission line at a second frequency farther to said one side of said central frequency, said third transmission line being tuned to present substantially short circuit impedance at the point of connection across the output transmission line at a third frequency to the other side of said central frequency, said fourth transmission line element being tuned to present substantially short circuit impedance at the point of connection to the output transmission line at a fourth frequency farther to the other side of said central frequency, and first, second, third and fourth transmission line sections connected in shunt across said transmission lines at the points of connection of said first, second, third and fourth transmission line elements respectively, each of said first and said second transmission line sections being adjusted in cooperation with the associated transmission line element to parallel resonance at said third frequency, each of said third and said fourth transmission line sections being adjusted in conjunction with the associated transmission line element to parallel resonance at said first frequency, the attenuation characteristics in said output and said branch transmission lines being in even symmetry with respect to said central frequency.

5. A band dividing filter arrangement including an input transmission line, an output transmission line and a branch transmission line connected in parallel to said input transmission line, first and second transmission line elements connected in shunt across said branch transmission line at equally spaced intervals of a quarter wavelength at a predetermined central frequency from the junction between said input and output transmission lines, and third and fourth transmission line elements connected in shunt across said output transmission line at said intervals, said first transmission line element being tuned to present substantially short circuit impedance at the point of connection to said branch transmission line at a first frequency to one side of said central frequency, said second transmission line element being tuned to present substantially short circuit impedance at the point of connection to said branch transmission line at a second frequency farther to said one side of said central frequency, said third transmission line being tuned to present substantially short circuit impedance at the point of connection across the output transmission line at a third frequency to the other side of said central frequency by an amount equal to the difference between said first and said central frequencies, said fourth transmission line element being tuned to present substantially short circuit impedance at the point of connection to the output transmission line at a fourth frequency farther to the other side of said central frequency by an amount equal to the difference between said first and said second frequencies, and first, second, third and fourth transmission line sections connected in shunt across said transmission lines at the points of connection of said first, second, third and fourth transmission line elements respectively, each of said first and said second transmission line sections being adjusted in cooperation with the associated transmission line element to parallel resonance at said third frequency, each of said third and said fourth transmission line sections being adjusted in conjunction with the associated transmission line element to parallel resonance at said first frequency.

6. A high pass-low pass filter arrangement including an input transmission line, an output transmission line and a dissipating transmission line connected in parallel to said input transmission line, first and second adjustable transmission line elements connected in shunt across said dissipating transmission line at intervals of ninety electrical degrees at a predetermined central frequency from the junction between said input and output transmission lines, and third and fourth adjustable transmission line elements connected in shunt across said output transmission line at said intervals, said first transmission line element being tuned to present substantially short circuit impedance at the point of connection to said dissipating transmission line at a first frequency higher than said predetermined central frequency, said second transmission line element being tuned to present substantially short circuit impedance at the point of connection to said dissipating transmission line at a second frequency higher than said first frequency, said third transmission line being tuned to present substantially short circuit impedance at the point of connection across the output transmission line at a third frequency lower than said central frequency, said fourth transmission line element being tuned to present substantially short circuit impedance at the point of connection to the output transmission line at a fourth frequency lower than said third frequency, and first, second, third and fourth adjustable transmission line sections connected in shunt across said transmission lines at the points of connection of said first, second, third and fourth transmission line elements respectively, each of said first and said second transmission line sections being adjusted in cooperation with the associated transmission line element to parallel resonance at said third frequency, each of said third and said fourth transmission line sections being adjusted in conjunction with the associated transmission line element to parallel resonance at said first frequency, the attenuation characteristics in said output and said dissipating transmission lines being in even symmetry with respect to said central frequency.

7. A high pass-low pass filter arrangement including an input transmission line, an output transmission line and a dissipating transmission line connected in parallel to said input transmission line, first and second adjustable transmission line elements connected in shunt across said dissipating transmission line at intervals of ninety electrical degrees at a predetermined central frequency from the junction between said input and output transmission lines, and third and fourth adjustable transmission line elements connected in shunt across said output transmission line at said intervals, said first transmission line element being tuned to present substantially short circuit impedance at the point of connection to said dissipating transmission line at a first frequency higher than said predetermined central frequency, said second transmission line element being tuned to present substantially short circuit impedance at the point of connection to said dissipating transmission line at a second frequency higher than said first frequency, said third transmission line being tuned to present substantially short circuit impedance at the point of connection across the output transmission line at a third frequency lower than said central frequency by an amount equal to the difference between said first and said central frequencies, said fourth transmission line element being tuned to present substantially short circuit impedance at the point of connection to the output transmission line at a fourth frequency lower than said third frequency by an amount equal to the difference between said first and said second frequencies and first, second, third and fourth adjustable transmission line sections connected in shunt across said transmission lines at the points of connection of said first, second, third and fourth transmission line elements respectively, each of said first and said second transmission line sections being adjusted in cooperation with the associated transmission line element to parallel resonance at said third frequency, each of said third and said fourth transmission line sections being adjusted in conjunction with the associated transmission line element to parallel resonance at said first frequency.

8. A vestigial side band filter arrangement, particularly for use in a television broadcasting system between a visual transmitter and an antenna where the transmitter generates a visual carrier with upper and lower side bands and the radiation from the antenna is not to include lower side band frequencies remote from the visual carrier because these frequencies are allocated to the aural signal band and upper side band of another adjacent-channel transmitter, including a coaxial input transmission line, a coaxial output transmission line and a coaxial dissipating transmission line connected in parallel to said coaxial input transmission line, first and second adjustable coaxial transmission line elements connected in shunt across said dissipating transmission line at successive intervals of ninety electrical degrees at a frequency midway between the frequencies of the visual carrier and the adjacent channel aural signal band from the junction between said input and output transmission lines, and third and fourth adjustable transmission line elements connected in shunt across said output transmission line at said intervals, said first transmission line element being short circuited at the end remote from the point of connection to said dissipating transmission line and having a length at which to present thereat substantially short circuit impedance at the carrier frequency, said second transmission line element being short circuited at the end remote from the point of connection to said dissipating transmission line and having a length at which to present thereat substantially short circuit impedance at a frequency in the upper side bands of said visual carrier, said third transmission line being short circuited at the end remote from the point of connection across the output transmission line and having a length at which to present thereat substantially short circuit impedance at a frequency in the adjacent channel aural band, said fourth transmission line element being short circuited at the end remote from the point of connection to the output transmission line and having a length at which to present thereat substantially short circuit impedance at a frequency in the lower side bands of said visual carrier, and first, second, third and fourth adjustable coaxial transmission line sections connected in shunt across said transmission lines at the points of connection of said first, second, third and fourth transmission line elements respectively, each of said first and said second transmission line sections being open circuited at the ends remote from the points of connection and being adjusted in conjunction with the associated transmission line element to parallel resonance at said frequency in the adjacent channel aural band, each of said third and said fourth transmission line sections being open circuited at the ends remote from the points of connection and being adjusted in conjunction with the associated transmission line element to parallel resonance at said carrier frequency, the attenuation characteristics in said output and said dissipating transmission lines being in even symmetry with respect to the frequency substantially midway between said carrier and said adjacent channel aural frequencies and midway between said frequency in the upper side band and that in the lower side band.

9. A vestigial side band filter arrangement, particularly for use in a television broadcasting system between a visual transmitter and an antenna where the transmitter generates a visual carrier with upper and lower side bands and the radiation from the antenna is not permitted to include lower side band frequencies remote from the visual carrier because these frequencies are allocated to the aural signal band and upper side band of another adjacent-channel transmitter, including an input transmission line, an output transmission line and a dissipating transmission line connected in parallel to said input transmission line, first and second adjustable transmission line elements connected in shunt across said dissipating transmission line at successive intervals of ninety electrical degrees at a predetermined frequency between the frequencies of said visual carrier and said aural signal band from the junction between said input and output transmission lines, and third and fourth adjustable transmission line elements connected in shunt across said output transmission line at said intervals, said first transmission line element being short circuited at the end remote from the point of connection to said dissipating transmission line and having a length at which to present thereat substantially short circuit impedance at the carrier frequency, said second transmission line element being short circuited at the end remote from the point of connection to said dissipating transmission line and having a length at which to present thereat substantially short circuit impedance at a frequency in the upper side bands of said visual carrier, said third transmission line being short circuited at the end remote from the point of connection across the output transmision line and having a length at which to present thereat substantially short circuit impedance at a frequency in the adjacent channel aural band, said fourth transmission line element being short circuited at the end remote from the point of connection to the output transmission line and having a length at which to present thereat substantially short circuit impedance at a frequency in the lower side bands of said visual carrier, and first, second, third and fourth adjustable transmission line sections connected in shunt across said transmission lines at the points of connection of said first, second, third and fourth transmission line elements respectively, each of said first and said second transmission line sections being open circuited at the ends remote from the points of connection and being adjusted in conjunction with the associated transmission line element to parallel resonance at said frequency in the adjacent channel aural band, each of said third and said fourth transmission line sections being open circuited at the ends remote from the points of connection and being adjusted in conjunction with the associated transmission line element to parallel resonance at said carrier frequency.

References Cited in the file of this patent

UNITED STATES PATENTS

| | | |
|---|---|---|
| 1,933,669 | Gilman | Nov. 7, 1933 |
| 1,934,602 | Gilman | Nov. 7, 1933 |
| 2,128,400 | Carter | Aug. 30, 1938 |
| 2,214,041 | Brown | Sept. 10, 1940 |
| 2,258,974 | Dagnall | Oct. 14, 1941 |
| 2,270,416 | Cork et al. | Jan. 20, 1942 |
| 2,284,529 | Mason | May 26, 1942 |

FOREIGN PATENTS

| | | |
|---|---|---|
| 590,474 | Great Britain | July 18, 1947 |
| 609,231 | Great Britain | Sept. 28, 1948 |